US007222023B2

United States Patent
Laurent et al.

(10) Patent No.: US 7,222,023 B2
(45) Date of Patent: May 22, 2007

(54) METHODS AND APPARATUS FOR PROCESSING SEISMIC DATA

(75) Inventors: Christophe Laurent, Horley (GB); Victor Aarre, Stavanger (NO)

(73) Assignee: WesternGeco L.L.C., Houston, TX (US)

(*) Notice: Subject to any disclaimer, the term of this patent is extended or adjusted under 35 U.S.C. 154(b) by 10 days.

(21) Appl. No.: 10/530,600

(22) PCT Filed: Oct. 7, 2003

(86) PCT No.: PCT/GB03/04364

§ 371 (c)(1),
(2), (4) Date: Aug. 29, 2005

(87) PCT Pub. No.: WO2004/031805

PCT Pub. Date: Apr. 15, 2004

(65) Prior Publication Data

US 2006/0100785 A1    May 11, 2006

Related U.S. Application Data (60) Provisional application No. 60/416,507, filed on Oct. 7, 2002.

(30) Foreign Application Priority Data

Apr. 16, 2003   (GB) .................................. 0308781.4

(51) Int. Cl.
    *G01V 1/28* (2006.01)
(52) U.S. Cl. ..................................................... 702/18
(58) Field of Classification Search ................... 702/14, 702/16, 17, 18
    See application file for complete search history.

(56) References Cited

U.S. PATENT DOCUMENTS

| 4,759,636 | A  | * | 7/1988  | Ahern et al. ................... 367/21  |
| 5,229,939 | A  |   | 7/1993  | Scheibner                               |
| 6,002,642 | A  | * | 12/1999 | Krebs .......................... 367/73 |
| 6,295,505 | B1 | * | 9/2001  | Assa et al. .................... 702/17 |
| 6,446,009 | B1 | * | 9/2002  | Baeten et al. ................. 702/17  |
| 2004/0076077 | A1 | * | 4/2004  | Robertsson et al. .......... 367/15  |
| 2004/0076078 | A1 | * | 4/2004  | Muijs et al. .................. 367/21  |

OTHER PUBLICATIONS

International Search Report; International Application No. PCT/GB03/04364; International Filing date Oct. 7, 2003; 2 pages.

\* cited by examiner

Primary Examiner—D. McElheny, Jr.

(57) ABSTRACT

A method of processing seismic data comprises identifying the value of a first parameter associated with an event in a first set of seismic data. The value of a second parameter associated with a corresponding event in a second sent of seismic data is then obtained using at least one look-up table. The first parameter may be PP travel time with the first data set being a raw PP data set, and the second parameter may be PS travel time with the second data set being a raw PS data set or reflection depth. The invention makes it possible to identify pairs of corresponding PP and PS events in raw data traces. The look-up table(s) are obtained using an assumed model for the velocity of propagation of acoustic energy within the earth. The results of the method may be used in quality control, or to correct the velocity model.

22 Claims, 6 Drawing Sheets

METHODS AND APPARATUS FOR PROCESSING SEISMIC DATA

CROSS-REFERENCE TO RELATED APPLICATIONS

This application is a 35 U.S.C. § 371 national stage filing from Patent Cooperation Treaty application number PCT/GB03/04364, filed Oct. 7, 2003, which in turn claimed priority from Great Britain patent application number 0308781.4, filed Apr. 16, 2003, from which Applicant claims foreign priority under 35 U.S.C. § 119(a), as well as from U.S. provisional patent application No. 60/416,507, filed Oct. 7, 2002, from which Applicant claims domestic priority under 35 U.S.C. § 119(e), all of which are incorporated herein by reference.

BACKGROUND OF THE INVENTION

1. Field of the invention

The present invention relates to processing seismic data, in particular to processing multi-component seismic data. In particular, it relates to processing multi-component seismic data to determine an event in one component that corresponds to an event in another seismic data component.

2. Description of Related Art

Figure 1:
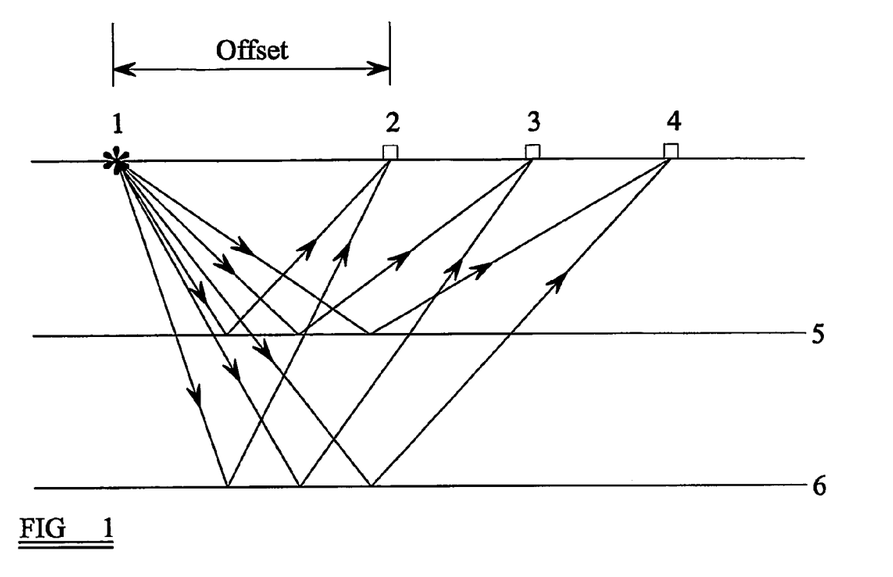
FIG. 1 is a schematic illustration of a land-based seismic survey.

FIG. 1 is a schematic illustration of a seismic survey. As is well known, a seismic survey is performed using at least one seismic source 1 and an array of seismic receivers 2, 3, 4. In FIG. 1 the source 1 and the receivers 2, 3, 4 are shown disposed on the earth's surface, but other arrangements are known such as, for example, disposing receivers in a borehole. When the source 1 is actuated, acoustic energy is emitted downwards into the earth, and is reflected by geological structures within the earth. The reflected energy is detected at the receivers 2, 3, 4.

FIG. 1 shows two geological structures 5, 6 that act as partial reflectors of acoustic energy. These structures may, for example, be interfaces between two layers of the earth's interior that have different acoustic properties. As a result, the data acquired at each of the receivers 2, 3, 4 contains one "event" corresponding to partial reflection of acoustic energy at the upper interface 5 and another "event" corresponding to partial reflection of acoustic energy at the lower interface 6. When seismic data are processed, each interface responsible for reflection of seismic data is allotted a unique "interface index", and events may be classified according to the index of the interface responsible for the event.

Figure 2:
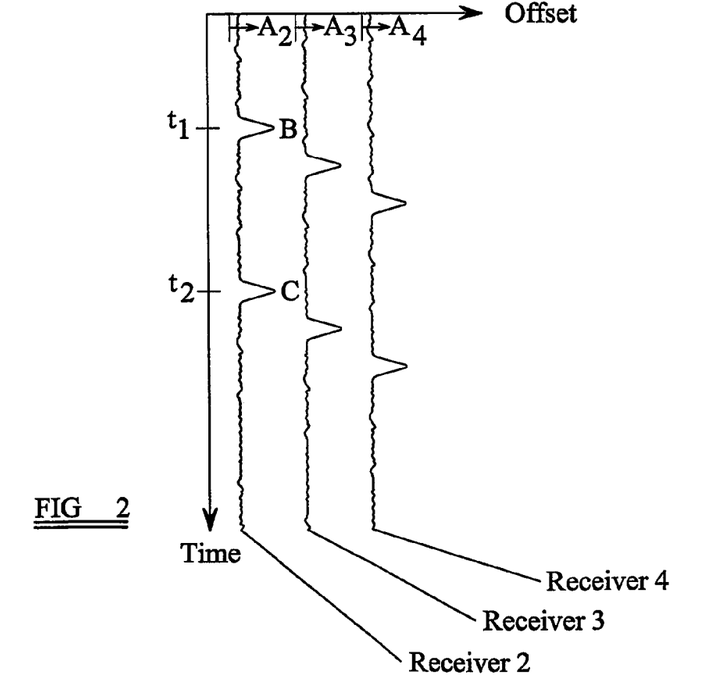
FIG. 2 shows typical data traces acquired in the seismic survey of FIG. 1.

Typical traces that would be acquired by the receivers 2, 3, 4 of FIG. 1 are shown in FIG. 2. The vertical axis of FIG. 2 denotes time since the actuation of the seismic source. The traces are arranged in order of increasing source-receiver distance (known as offset). Thus, the trace having the lowest offset is at the left, and offset increases to the right. Within each trace, the horizontal scale provides a measure of the amplitude of seismic energy acquired at each receiver. "A2", "A3" and "A4" denote the amplitude of the trace acquired at the receiver 2, at the receiver 3 and at the receiver 4 respectively.

If the three traces in FIG. 2 are compared, it will be seen that each trace contains an event B corresponding to reflection at the upper interface 5 and another event C corresponding to reflection of acoustic energy at the lower interface 6. However, events corresponding to reflection at a particular interface do not occur at the same time in each trace. For example, the event B occurs at time $t_1$ in the trace acquired at receiver 2, but occurs at greater times in the traces acquired by other receivers. This is because the overall path length from the source to the receiver, and hence the travel time, increase with increasing source-receiver separation. The increase in arrival time of an event with increasing offset is known as "moveout".

Many seismic surveys use multi-component seismic receivers, which are able to acquire at least two components of the seismic wave field incident on the receiver. A 3-component, or 3-C, receiver, for example, records three orthogonal components of the seismic wavefield, and these are normally taken to be the x-, y- and z- (vertical) components of the wavefield.

Acoustic energy emitted by the seismic source 1 is predominantly a pressure-wave (or p-wave). When the energy undergoes reflection an interface 5, 6, however, it may also undergo partial mode conversion to a shear wave (s-wave). The seismic wavefield acquired at the receiver 2, 3, 4 will therefore both contain p-waves and s-waves. Events arising from arrival of p-waves are generally referred to as PP events, since they involve seismic energy that is emitted as a p-wave and that is incident on the receiver as a p-wave. Events arising from s-waves are generally referred to as PS events, since they arise from acoustic energy which is emitted as a p-wave and which undergoes mode-conversion to an s-wave upon reflection and so is incident on the receiver as an s-wave. PP events occur most strongly in vertical components of the acquired seismic data, whereas PS events appear most strongly in the horizontal component of the acquired seismic data Where partial mode conversion occurs, the seismic energy reflected as a p-wave gives rise to a PP event in the acquired seismic data and the seismic energy reflected as a (mode-converted) s-wave gives rise to a corresponding PS event in the acquired seismic data. A PP event and a PS event are said to be "corresponding events" if the PP event and the PS event involve reflection at the same interface within the earth's interior. The velocity of propagation of a p-wave through the earth is generally not equal to the velocity of propagation of an s-wave, so that a PP event in seismic data acquired at a receiver will in general not occur at the same time as the corresponding PS event. When multi-component seismic data is processed, it is often desirable to identify corresponding pairs of a PP event in the vertical component of the seismic data and a PS event in a horizontal component of the seismic data. This allows information about the reflector to be obtained from the PP data and from the PS data The data traces shown in FIG. 2 represent seismic data traces essentially as acquired at the receiver 2, 3, 4. These are generally referred to as "raw" data traces.

In conventional seismic data processing, the raw data traces of FIG. 2 are first processed to compensate for the source-receiver offset. The effect of this processing is to transfer each event in a trace to the time at which it would have occurred if there had been zero source-receiver offset—i.e. if the source and receiver were co-incident. If the correction for offset is performed correctly, an event corresponding to reflection at one interface should occur at the same time in each offset-corrected trace—the event should have zero moveout in the corrected traces, and correction to zero-offset is therefore know as "moveout correction". The traces corrected to zero offset may then be averaged, or "stacked", and this attenuates random noise in the traces.

Methods have been proposed for identifying corresponding PP and PS events in stacked seismic data. In general, these methods assume that there is a constant linear relation between the arrival time of a PP event and the arrival time of the corresponding PS event. The arrival time of an event in the PP data can be mapped onto the expected arrival time of the corresponding event in the PS data by multiplying the PP arrival time by a constant factor, known generally as "vertical gamma". The "vertical gamma" factor is essentially a squeeze/stretch factor, that stretches or squeezes the vertical axis (time axis) of traces for a vertical component of the seismic data to have the same scale as the vertical axis (time axis) of traces of a horizontal component of the seismic data.

The magnitude of the "vertical gamma" factor may be determined simply by manual identification of pairs of corresponding PP and PS events in the stacked seismic data, and deriving the vertical gamma factor from their respective arrival times. It is also known to use an interactive approach in which an initial value of the vertical gamma factor is picked from the stacked traces for the horizontal and vertical components, and is then used to assist in identification of further pairs of corresponding PP and PS events. Once further pairs of corresponding events have been identified, their arrival times may be used to refine the value of the vertical gamma factor.

These prior art techniques may not, however, be applied to raw data traces of the type shown in FIG. 2. The source-receiver offset varies from one raw trace to another, so that the arrival time of an event depends on the offset as well as on the velocity of propagation of acoustic energy. It is therefore not possible to match the arrival times of events in raw horizontal data traces with arrival times of events in raw vertical data traces using a constant scaling factor.

BRIEF SUMMARY OF THE INVENTION

The present invention provides a method of processing seismic data, the method comprising:
a) identifying the value of a first parameter associated with an event in a first set of seismic data; and
b) obtaining, using at least one look-up table, the value of a second parameter, the second parameter being associated with a corresponding event in a second set of seismic data.

The look-up table or look-up tables may give values for parameters of the sets of seismic data, such as the PP travel time, the PS travel time, or the depth at which a reflection occurs, in terms of parameters of the survey such as the source-receiver offset and the index of the interface at which reflection occurs. The look-up tables therefore implicitly include velocity information, since they are derived using, for example, a particular model for the velocity of propagation of acoustic energy in for the earth's interior. The method of the present invention may therefore be applied to raw data traces, and allows, for example, an event in a raw PS data set (that is, an event in a set of raw PS data traces) that corresponds to an event in a raw PP data set.

The invention also provides an apparatus for processing seismic data, comprising: means for identifying the value of a first parameter associated with an event in a set of seismic data; and means obtaining, using first and second look-up tables, the value of a second parameter, the second parameter being associated with another event in the set of seismic data.

Preferred features of the present invention are defined in the dependent claims.

BRIEF DESCRIPTION OF THE SEVERAL VIEWS OF THE DRAWINGS

Preferred embodiments of the present invention will now be described by way of illustrative example with reference to the accompanying figures in which.

DETAILED DESCRIPTION OF THE INVENTION

Preferred embodiments of the present invention will now be described in detail, by way of illustrative example.

The principle of the present invention is to generate two or more look-up tables that give values for respective parameters of the acquired seismic data as a function of 1 or more other parameters. In the embodiment described below, three look-up tables are used, but the invention is not limited to this number of look-up tables. In the embodiment described below the three look-up tables relate to, respectively, the reflection depth of an event, the PP travel time of an event, and the PS travel time of an event, and are a function of the source-receiver offset and the index of the interface. The term "reflection depth" of a seismic event, as used herein, denotes the depth at which the reflection of energy which gives rise to that event occurs.

In general, a look-up table for a parameter P has the form of: "LUT P (source position, receiver position, interface index)". In the case of a one-dimensional seismic surveying arrangement, in which the source(s) and receiver(s) are arranged along a straight line, the source position and receiver position can be replaced by a single parameter indicative of the distance between the source and receiver, such as offset. Thus, in a 1-D case, a look-up table has the general form LUT P (offset, interface index). In a 2-D or 3-D case, however, the co-ordinates (x,z) or (x,y,z) of the source and the receiver need to be taken account of. The embodiment of the invention described below refers to the 1-D case for simplicity, but the invention may be applied in a 2-D or 3-D case.

In this embodiment, therefore, the three look-up tables are as follows:

LUT time PP (offset, interface index);
LUT time PS (offset, interface index); and
LUT depth (interface index).

(The interface depth is not a function of offset, so the depth LUT depends only on the interface index.)

Figure 3:
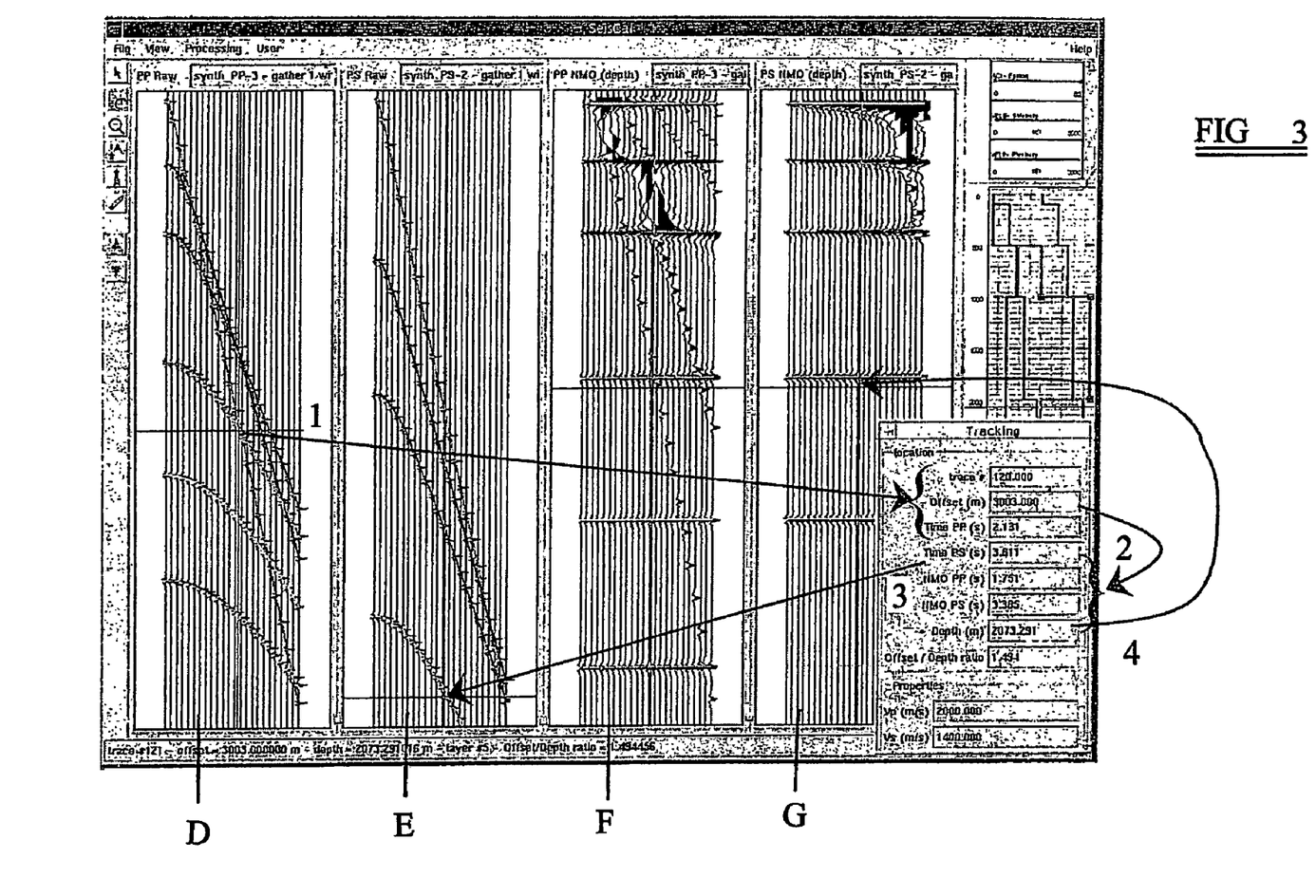
FIG. 3 illustrates a method according to a first embodiment of the present invention.

FIG. 3 illustrates one method according to the present invention. Of the four panels in FIG. 3, the left-hand panel D shows raw data traces for the vertical component of acquired seismic data—and these will be referred to as PP raw data traces since, as noted above, the vertical component of the acquired seismic data contains predominantly PP events.

The next panel E in FIG. 3 corresponds generally to panel D, but shows raw data traces for a horizontal component of acquired seismic data. These traces contain predominantly PS events, and so are referred to as PS raw data traces.

Panel F in FIG. 3 contains offset-corrected traces corresponding to the raw data traces in panel D. That is, each trace in panel F is obtained from the corresponding trace in panel D by correcting the trace to zero offset. Furthermore, a trace that is corrected to zero offset corresponds to a seismic energy path that penetrates vertically into the earth to a certain depth, so that there is a direct relationship between the travel time of seismic energy and the depth at which the seismic energy is reflected. The vertical axis of the traces in panel F has therefore been converted from time to depth, whereas the vertical axes in panels D and E represent time. The correction to zero-offset, and the time-to-depth conversion, are carried out using an assumed model for the velocity of propagation of p-waves and s-waves. In FIG. 3, the velocity model has been obtained using ray-tracing, as will be described below. However, the correction to zero offset and the time-to-depth conversion may alternatively be carried out using a velocity model in which the p-wave velocity is assumed to be approximated by an "effective velocity" which is constant and isotropic (correcting for offset using this model is the well-known "normal moveout" or NMO correction).

It will be seen that whereas the events in the raw PP data traces of panel D occur at different times in traces acquired at different source-receiver offsets, most events in the offset-corrected PP data traces of panel F occur at the same time in each trace.

Finally, panel G (the right-hand panel) shows the PS data traces of panel F after correction to zero source-receiver offset and time-to-depth conversion. The correction to zero-offset and the time-to-depth conversion for ps-waves are carried out using the same model for the velocity of propagation of p-waves and s-waves within the earth. In the embodiments of FIG. 3 ray tracing was again used, although an "effective velocity" model may alternatively be used for s-waves (but the velocity used in the NMO correction for PS events will, in general, not be the same as the velocity used in the NMO correction for PP events).

In the traces shown in FIG. 3, the traces are arranged in the order of increasing source-receiver offset, and within each trace the horizontal scale is indicative of the amplitude of the seismic energy incident on the receiver. In panels D and E the vertical axis represents time since actuation of the source. For the offset-corrected traces in panels F and G, the seismic energy path is now a path that simply penetrates vertically into the earth to a certain depth, and there is a direct relation between the zero-offset travel time and the reflection depth. While the vertical axis in panels F and G could represent zero-offset travel time, it may be more useful if the vertical axis in panels F and G is converted, as shown in FIG. 3, to represent the reflection depth as explained above. FIG. 3 thus shows four sets of data—a raw PP data set, a raw PS data set, an offset corrected (and time-to-depth converted) PP data set and an offset corrected (and time-to-depth converted) PS data set In the method illustrated in FIG. 3, an event in one of the data sets is initially selected. This is represented by step 1 in FIG. 3. In FIG. 3, the selected event is in the raw PP data set, being an event in one of the PP raw data traces of panel D, but the trace that is selected initially could equally well be in one of the PS raw data traces.

Selecting an event in a particular data set, by selecting an event in a raw data trace, defines a time, corresponding to the arrival time of the event. Where the selected event is a PP event, a PP travel time is defined. Selecting an event also defines an offset, corresponding to the source-receiver offset used to acquire the trace in which the selected event occurs. For the particular PP event selected in FIG. 3, the offset is 3003 meters and the PP travel time is 2.131 seconds.

Since both the PP travel time and the offset are known, the "LUT time PP" look-up table may be used to determine the interface index corresponding to the selected event.

Next, at step 2, the "LUT time PS" look-up table is used to find the PS travel time corresponding to the offset (as determined for the original selected event) and the interface (as determined from the "LUT time PP" look-up table). This produces the PS travel time of the PS event that corresponds to the PP event selected at step 1. In FIG. 3, the PS travel time corresponding to the selected PP event is determined to be 3.611 seconds.

Once the PS travel time corresponding to the selected PP event has been determined, it is straightforward to identify, in the raw PS data set, the PS event corresponding to the selected PP event. The corresponding PS event is the event in the raw PS data that occurs in the raw PS data trace having the same offset as the selected PP event and that occurs at the PS travel time determined in step 2. This is indicated as step 3 in FIG. 3.

The present invention thus allows corresponding PP and PS events to be determined in raw data traces.

The depth of the reflection point that gives rise to the event selected at step 1 may also be determined, using the "LUT depth" look-up table. In FIG. 3, the reflection depth corresponding to the selected PP event is determined to be 2073.291 meters.

In a preferred embodiment, the traces are displayed as shown in FIG. 3 on a computer screen. The event selected at step 1 is selected by, for example, positioning the cursor of a computer mouse over the selected event and "clicking" the mouse button. When the corresponding PS travel time has been determined, the event that occurs at that travel time in the raw PS data trace having the same offset at the selected event may be automatically highlighted on the computer screen in some way. This may be done, for example, by changing the background colour of a small region of the screen surrounding the corresponding PS event.

Additionally or alternatively, it is possible to identify an event in the offset-corrected PP and/or PS data sets that has the same offset as the originally selected event and that has the depth determined from the "LUT depth" look-up table. This is indicated in FIG. 3, as step 4. The event identified in the offset-corrected PP and/or PS data sets may again be highlighted on the computer display in any convenient manner.

The above is a simple description of this embodiment, and assumed that when the interface index of the initially-selected event was determined, there would be an exact match. This may not always be the case, and in a more realistic embodiment an interpolation process is used. In this method, the following detailed steps are involved. It will be assumed that this embodiment is implemented by the user moving a cursor through the raw PP data set and selecting an event using the cursor. However, the invention is not limited to this.

The cursor location when the user selects an event in panel D gives the PP travel time $t_{pp}$ and the source-receiver offset o of the selected event. The model based cursor tracking algorithm then finds interface index i such that:

$$\text{LUTtime}PP(o,i) < t_{pp} < \text{LUTtime}PP(o,i+1).$$

It is then possible to compute a linear interpolation factor α where $$\alpha = (\text{LUTtime}PP(o,i+1) - tpp)/(\text{LUTtime}PP(o,i+1) - \text{LUTtime}PP(o,i))$$

Thus, it is possible to find the corresponding PS time tps and depth of the reflection point d with a linear interpolation of the corresponding look-up tables:

$$tps = \alpha\text{LUTtime}PS(o,i) + (1-\alpha)\text{LUTtime}PS(o,i+1)$$

$$d = \alpha\text{LUTdepth}(i) + (1-\alpha)\text{LUTdepth}(i+1)$$

The values determined for tps and d may be displayed to the user, as shown in the bottom right of FIG. 3. Additionally or alternatively, the display may highlight the corresponding point at (o, tps) in the raw PS seismic data set of panel E and/or the corresponding points at (o, d) in the offset-corrected and time-to-depth corrected PP and PS seismic data sets of panels F and G.

In the examples described above the user has initially selected an event in the raw PP data set, for example by placing the cursor of a computer mouse over the event in the displayed image. The user could alternatively select an event in the raw PS data set of panel E, and in this case the method of the invention would provide the corresponding PP travel time and/or the corresponding depth. As a further alternative, the user could select an event in the offset-corrected PP or PS data sets of panel F or G, and in this embodiment the method would provide the PP and PS travel times of the corresponding events in the raw PP data set and the raw PS data set.

Figure 4:
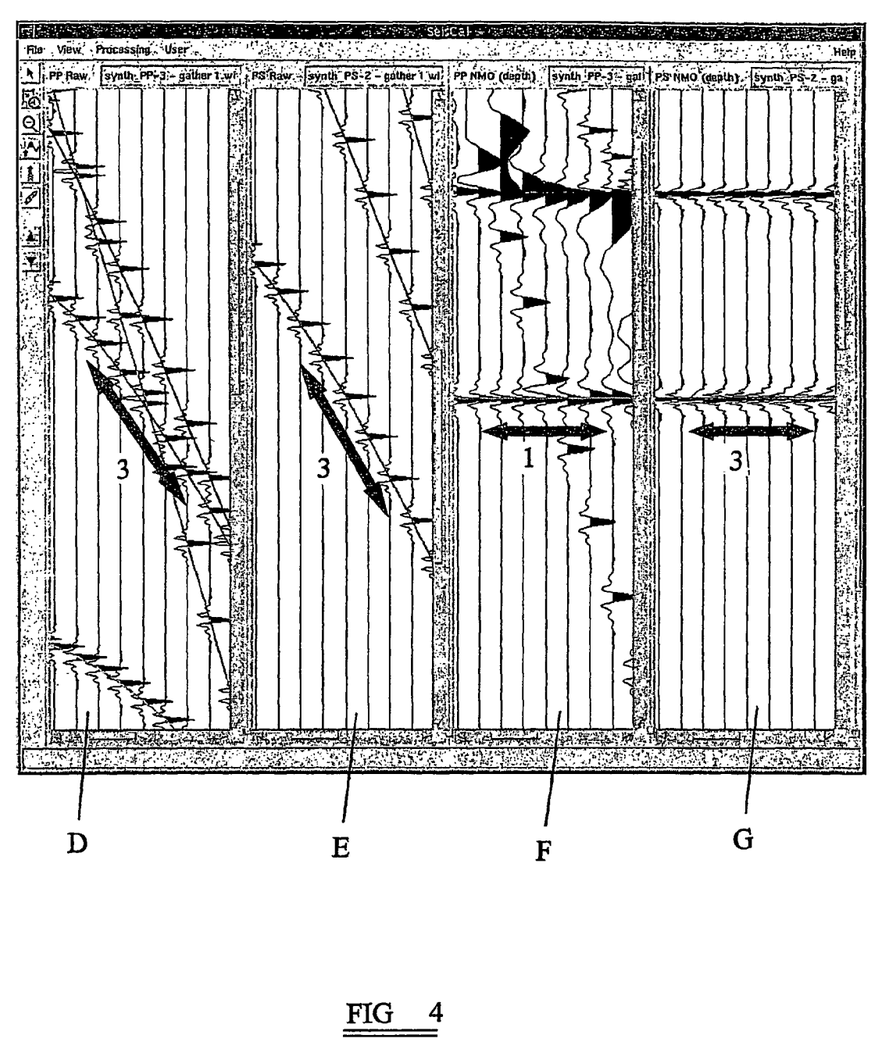
FIG. 4 illustrates a method according to a second embodiment of the present invention.

FIG. 4 illustrates a further embodiment of the invention. The four sets of data shown in FIG. 4 are again PP raw data traces (panel D), PS raw data traces (panel E), PP offset-corrected and time-to-depth converted data traces (panel F) and PS offset-corrected and time-to-depth converted data traces (panel G). The traces are shown in FIG. 4 with a higher enlargement than in FIG. 3, so that correspondingly fewer traces are shown, over a shorter time window.

In this embodiment, it is assumed that the user implicitly selects an event in an offset-corrected data trace, by moving scroll bars of panel F or panel G to position a selected event near the centre of the "window" defined by the scroll bars. In FIG. 4, the selected event is shown as an event in a PP offset-corrected and time-to-depth converted trace. The following detailed steps are involved when the user scrolls horizontally in the offset-corrected PP data (as denoted by the arrow labelled 1):

The centre of the window for panel F defines an event in the offset-corrected PP data having a reflection depth d and source-receiver offset of o. This embodiment is implemented by a model-based scrolling algorithm which then finds an interface having interface index i such that:

$$\text{LUTdepth}(i) < d < \text{LUTdepth}(i+1)$$

It is again possible to compute the linear interpolation factor α where $$\alpha = (\text{LUTdepth}(i+1) - d)/(\text{LUTdepth}(i+1) - \text{LUTdepth}(i))$$

Thus, it is possible to find the corresponding PP time tpp and PS time tps with a linear interpolation of the corresponding look-up tables:

$$tps = \alpha\text{LUTtime}PS(o,i) + (1-\alpha)\text{LUTtime}PS(o,i+1)$$

$$tpp = \alpha\text{LUTtime}PP(o,i) + (1-\alpha)\text{LUTtime}PP(o,i+1)$$

The model based scrolling algorithm then scrolls the window through which panel D (raw PP traces) is displayed so that its centre is (o, tpp) and scrolls the window through which panel E (raw PS traces) is displayed so that its centre is (o, tps). The algorithm also scrolls the window through which panel G is displayed so that its centre is (d, o). The windows through which the four data sets are displayed are all linked together, so that the corresponding events are positioned at the centre of each window.

In FIG. 4, the arrow 1 in panel F denotes horizontal scrolling through panel F. The arrows 3 in panels D, E and G shows the scrolling direction in these panels produced by the scrolling algorithm as a result of horizontal scrolling through panel F. As expected, horizontal scrolling through panel F also produces horizontal scrolling through panel G, since both panels shows offset-corrected data sets. However, horizontal scrolling through panel F does not produce horizontal scrolling in the raw data sets of panels D and E, since time increases with offset in these raw data sets.

Panels F and G of FIGS. 3 and 4 show, as noted, PP traces and PS traces that have been corrected for offset and time-to-depth converted. These offset-corrected traces are obtained using the same velocity model as used to derive the look-up tables. This is illustrated in FIG. 5 of the application.

To determine the offset-corrected PP traces, for example, the raw vertical component traces, the "LUTtimePP" look-up table and the "LUTdepth" look-up table are required. The two look-up tables are used to correct the raw vertical component data traces to zero offset. This may be done by determining the interface index for a PP event in a trace with a particular offset, using the "LUTtimePP" look-up table. The "LUTtimePP" look-up table may then again be used to determine the travel time for zero offset for that interface index.

The effect of correcting raw data traces for the source-receiver offset is to produce the trace that would have been obtained if the source and receiver were co-incident. This would again be a trace that had time along its vertical axis, and the amplitude of the acquired seismic component along the horizontal axis. However, since the seismic energy path is now a path that simply penetrates vertically into the earth to a certain depth, there is a direct relation between the zero-offset travel time and the reflection depth. The relationship will depend on the velocity model used to perform the correction for offset—in the simplest case, in which the velocity is assumed to be uniform and isotropic within the earth, the zero-offset travel time is proportional to the reflection depth.

Figure 5:
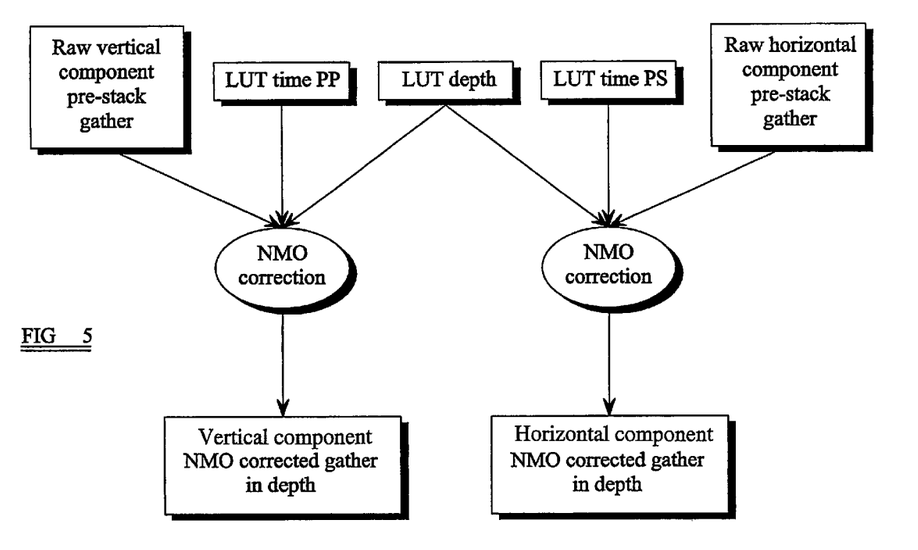
FIG. 5 is a schematic illustration of a third embodiment of the present invention.

In FIG. 5, therefore, once the correction for offset has been carried out to obtain a zero-offset trace, the resultant zero-offset trace is then depth-converted using the "LUTdepth" look-up table. This produces offset corrected, time-to-depth corrected data, so that the vertical axis of the trace is converted from travel time to reflection depth. The result, as shown in the two right-hand panels in FIGS. 3 and 4, is a series of traces that simulate traces acquired at zero source-receiver offset, and that have reflection depth as the vertical axis. If the offset-corrected data is not time-to-depth converted, but is indexed by time (i.e., displayed with time as the vertical axis) then use of the LUTtimePP look-up table is sufficient and the LUTdepth look-up table is not required.

(It should be noted that offset corrected, time-to-depth corrected data may be produced in one step. The steps of (1) correction for offset and (2) time-to-depth conversion have been described separately above for ease of understanding, but the steps may be combined by using the LUTdepth look-up table directly instead of the LUTdepthPP look-up table.)

The raw horizontal seismic data traces (the PS raw data traces) may be corrected for offset and, if desired, converted to show depth along their vertical axes, in an analogous way as also shown in FIG. 5, using the LUTtimePS look-up table instead of the LUTtimePP look-up table.

In the embodiment of FIG. 5, the correction to zero-offset is carried out using a model-based NMO correction, based on the results of ray-tracing. The invention is not limited to this specific method of correcting to zero-offset, however, any suitable method may be used such as, for example, the well-known "effective velocity" model.

As mentioned above, the look-up tables relate reflection depth, PP travel time or PS travel time to the offset and the interface index according to a chosen velocity model. Two examples of ways in which the look-up tables may be determined will now be described with reference to FIG. 6.

Figure 6:
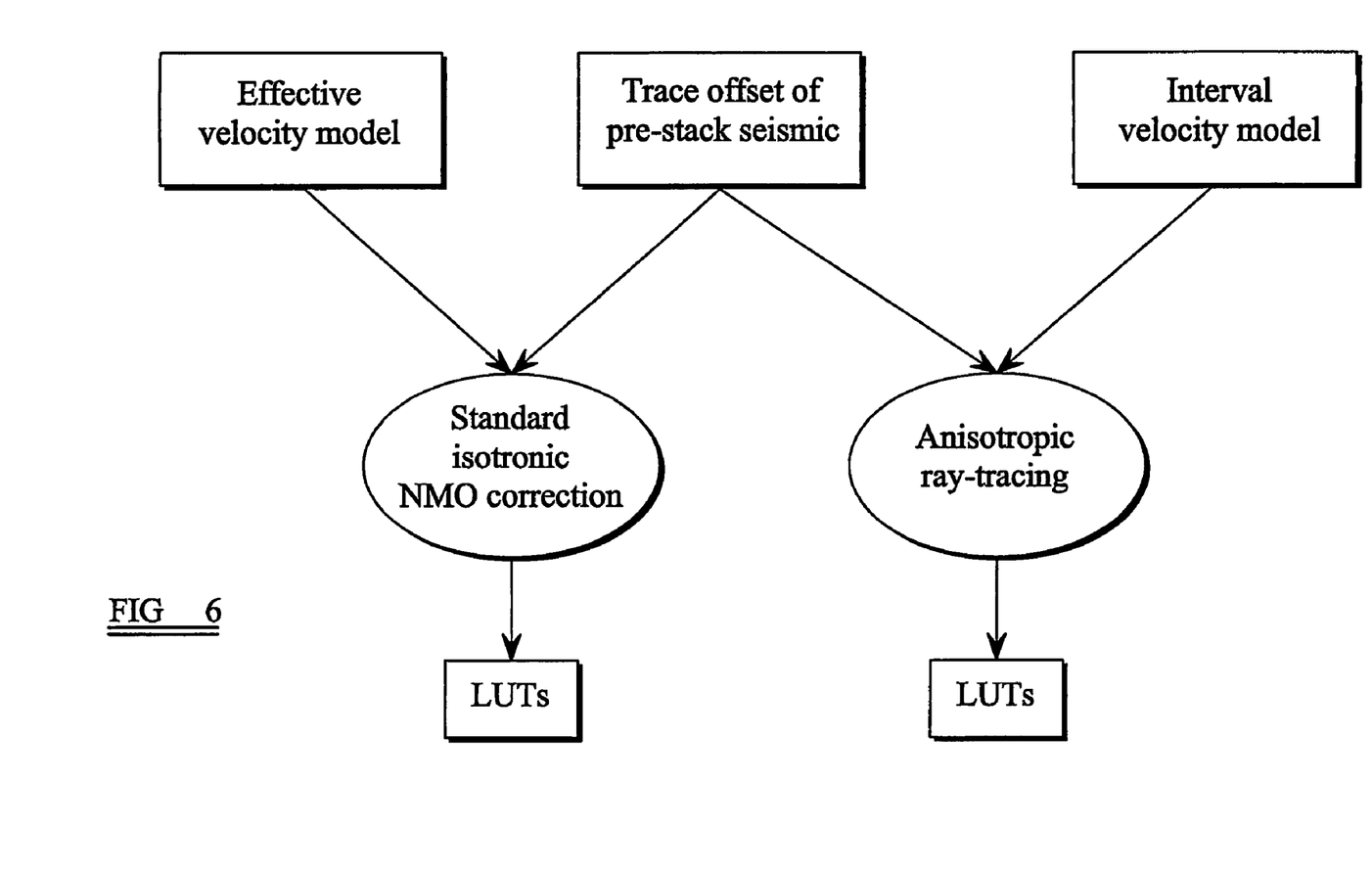
FIG. 6 illustrates a method of generating a look-up table.

One method of determining the look-up tables makes use of an effective velocity model in which the parameters are normal move-out velocity fields for the PP and PS waves, and a vertical gamma field. Initially, the Vnmo(PP) velocity field is converted to an interval velocity field, Vint(PP), which is indexed in depth. This conversion may be carried out using the Dix formula. The interval velocity field may then be used to map zero-offset PP travel time to depth, and vice versa.

The vertical gamma field is used to map from zero-offset PS travel time to zero-offset PP time. The combination of the vertical gamma field and the interval velocity field indirectly provide a map from the zero-offset PS travel time to depth, and vice versa.

Next, for every pair of values for source-receiver offset and interface index, the zero-offset PP travel time is determined using the Vnmo(PP) velocity field; similarly, the zero-offset PS travel time is determined for every pair of source-receiver offset and interface index using the Vnmo(PS) velocity field. The LUTdepth look-up table is also calculated, and this provides an indirect mapping from zero-offset time to depth, through the interface index.

The above method is shown as the left-hand part of FIG. 6.

An alternative method of determining the look-up tables is to use anisotropic ray tracing. In this method, an elastic, anisotropic model of the relationship between velocity and depth is set up. Two-point ray tracing from the source to the receiver is then used, to determine the travel time associated with one trace—for example, for a PP trace that involves reflection from a particular interface defined in the velocity model. This process is repeated for every source-receiver combination, for every interface, for both PP and PS reflections. For each trace, this method determines the travel time, which will be a PP travel time or a PS travel time as appropriate, and the reflection depth. Thus, this method determines the depth, PP time and PS time for every source-receiver offset and for every interface in the velocity model used. These travel times and reflection depths are stored in the respective look-up tables.

Look-up tables for a 2-D or 3-D embodiment of the invention may also be obtained using ray-tracing.

The invention, as described above, provides, starting from an initial velocity model, a method of navigating from an event in a data trace relating to one component of seismic data to a corresponding event in a data trace relating to another component of the seismic data The invention may be used to provide a quality control (QC) measure. If there is a discrepancy between, for example, the estimated PS travel time for an event corresponding to a PP event and the actual position of the corresponding PS event, this suggests that the velocity model is incorrect. The invention may therefore be used to provide QC on the velocity model. For QC purposes, it is sufficient to display the results. For example the offset and PS travel time calculated to correspond to a selected event in the raw PP data set may be displayed on a display screen (for example the display screen of a computer) or as hard copy, as shown in the right hand lower corner of FIG. 3. An operator can determine whether the raw PS data set contains an event at that time and offset.

In addition to QC purposes, the invention may also be used to refine one or more of the look-up tables by refining the velocity model used to determine the look-up tables. If the results show a discrepancy between the estimated position of an event and the actual position of an event it is possible to use this result to up-date the velocity model used to determine the look-up tables, and re-calculate one or more of the look-up tables using the up-dated velocity model. The present invention thus makes possible dynamic, interactive correction of a velocity model. The correction may be performed in an iterative manner, until the estimated position of an event and the actual position of that event are substantially the same. The correction of the velocity model may be performed as a continuous process while the user is selecting events, and the look-up tables can be recalculated "on-the-fly".

Once corresponding PP and PS events have been determined it is much more easy to identify discrepancies in the velocity model. For example, residual moveout at far offsets suggests anisotropy, mis-tie between well data and PP data suggest anisotropy, and mis-tie between PP and PS seismic suggest errors in the "vertical gamma" used. Assuming sufficient data quality, a user should be able to pick interactively and interpret the PP and the PS moveout curve for any interface, and invert for the optimal elastic properties (velocities) for the interface.

It is generally recognized that an elastic attenuation will impose a frequency-dependent phase shift (and attenuation) to a wavelet propagating through the earth. Thus, in the case where the recorded PP and PS seismic waveforms are not perfectly in-phase with one another, it is reasonable to expect a certain mis-tie between PP and PS events, owing to the phase-shift. If an estimate of $Q_p(f,z)$ and $Q_s(f,z)$ is available (e.g. derived from walkaway-VSP data) so that the anelastic attenuation for each layer in the earth model is known, it is in theory possible to apply a time-variant inverse-Q filter on the PP and PS seismic data In order to do it is necessary to use the previously generated map functions to calculate the offset begin and end times for each layer for each trace, and apply the inverse Q filter for that part of the trace. (The begin time for a layer is the time at which seismic energy enters a layer, from above or from below, and the end time is the time at which the seismic energy leaves the layer.) This will shift the apparent events to a more true temporal location, enabling more accurate event matching and/or velocity inversion.

There are several ways to estimate geometrical spreading, based only on a background velocity model. A user could apply geometrical spreading correction to the seismic as well, in a similar way as for the inverse-Q filter (i.e. to calculate a time-offset variant gain, based on the map functions) and apply this to the data in real-time, and re-calculate the gain function every time the velocity function is updated (e.g. by inversion of PP and PS moveout curves).

In order to model the transmission loss, an estimate of the density (in addition to the velocity), as a function of depth, is required. The density can be determined from for example RHOB (density) logs (usually indexed in depth). Alternatively, an empirical relationship (e.g. Gardener's equation) can be used to estimate density as a function of velocity and depth. The PP and PS acoustic impedance can then be calculated, and the PP and PS reflection coefficients at any offset and depth can then be estimated by some approximation of the Zoeppritz equation, or modelled through ray-tracing. A user will thus be able to correct the PP and PS seismic data for transmission loss, based on the background velocity model and the calculated map functions, and apply the correction to the seismic data in real-time.

The incidence angle for the propagating wave at any interface for an offset can always be estimated as well. If the map functions are generated by ray-tracing, an exact estimate of the incidence angle is always calculated, and this could be recorded for later use in separate look-up tables. This angle information can be used to sort the PP and PS seismic gathers into angle bands, or the incidence-angles as a function of depth and offset could be plotted as contour lines on top of the PP and PS seismic gathers in real time. Optionally, the user will then be able to link the horizontal movement of the cursor and scroll bar to the incidence angle field, enabling a horizontal cursor tracking based on incidence angle instead of offset. For example if the user locates the cursor on a sample at interface index 5 and offset=$x_{pp}$, in the PP seismic gather, it is possible to look up the incidence angle $\alpha_{pp}$ for the propagating wave at that location. The corresponding offset $x_{ps}$ in the PS gather which has the same incidence angle for the given interface can then be determined, and that location in the PS gather can be highlighted.

The invention does have further applications. For example, since the mapping functions used in the determination of the look-up tables relate to PP travel time and PS travel time at non-zero offset with the PP and PS travel time at zero-offset, and thus with the reflection depth, the look-up tables of the invention may also be used to perform automatic offset correction of raw PP or PS data traces. Furthermore, once offset-correction has been carried out, the invention may further be used to convert the vertical axis of the zero-offset traces from time to depth.

Figure 7:
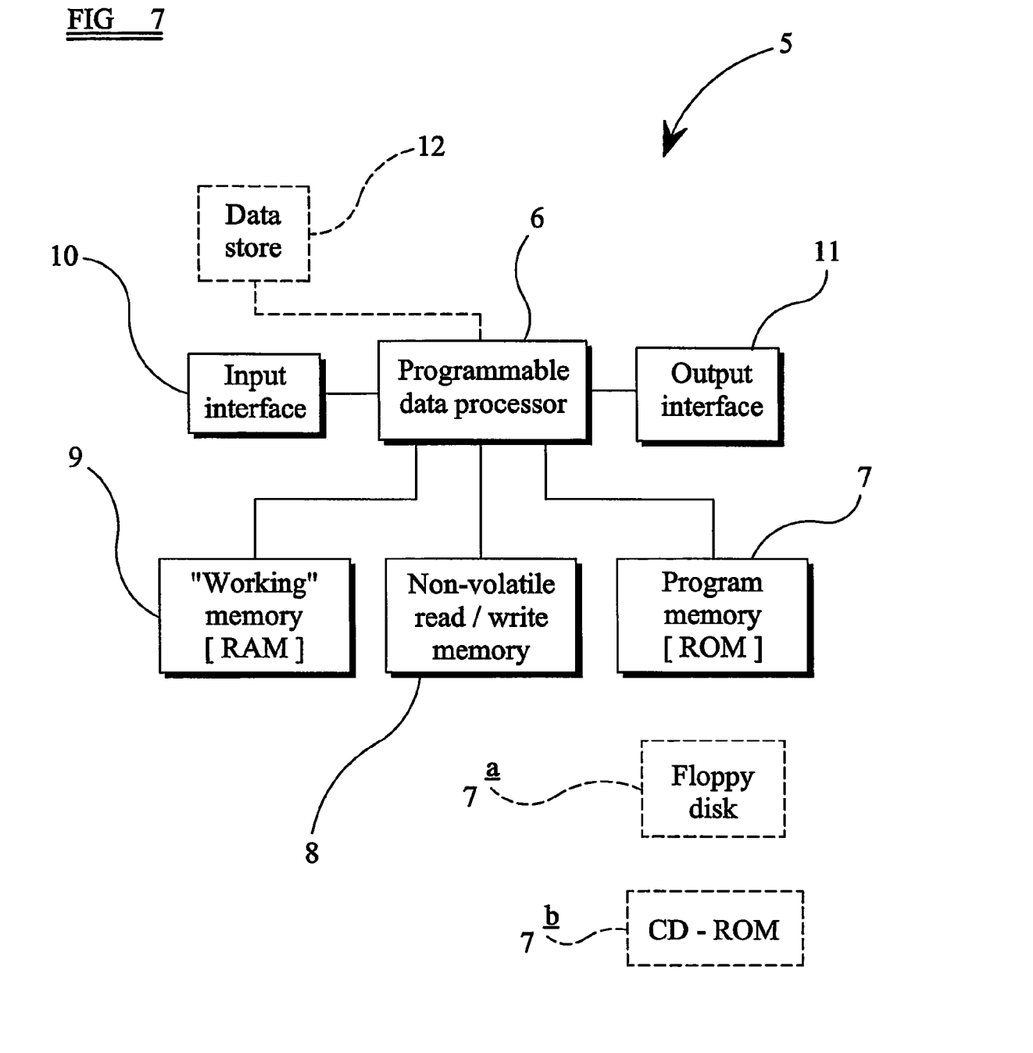
FIG. 7 is a schematic block diagram of an apparatus according to the present invention.

FIG. 5 is a schematic block diagram of a programmable apparatus 5 according to the present invention. The apparatus comprises a programmable data process 6 with a programme memory 7, for instance in the form of a read-only memory (ROM), storing a programme for controlling the data processor 6 to perform any of the processing methods described above. The apparatus further comprises non-volatile read/write memory 8 for storing, for example, any data which must be retained in the absence of power supply. A "working" or scratch pad memory for the data processor is provided by a random access memory (RAM) 9. An input interface 10 is provided, for instance for receiving commands and data. An output interface 11 is provided, for instance for displaying information relating to the progress and result of the method. Seismic data for processing may be supplied via the input interface 9, or may alternatively be retrieved from a machine-readable data store 12.

The output interface 11 may preferably comprise a display screen able to display seismic data in the manner shown generally in FIG. 3 or FIG. 4.

The programme for operating the system and for performing the method described hereinbefore is stored in the programme memory 7, which may be embodied as a semi-conductor memory, for instance of the well-known ROM type. However, the programme may be stored in any other suitable storage medium, such as magnetic data carrier 7a, such as a "floppy disk" or CD-ROM 7b.

The invention claimed is:

1. A method of processing raw seismic data traces obtained during a seismic survey to match a seismic event in a first set of raw seismic data traces with a seismic event in a second set of raw seismic data traces, the method comprising: a) identifying a value of a first parameter associated with a seismic event in a first set of raw seismic data traces; b) obtaining, using at least one look-up table, a value of a second parameter, the second parameter being associated with a corresponding seismic event in a second set of raw seismic data traces; and, c) using the values of the first and second parameters to match the seismic event in the first set of raw seismic data traces with the seismic event in the second set of raw seismic data traces and thus provide knowledge of one or more subterranean geological structures.

2. A method as claimed in claim 1 and comprising obtaining the value of the second parameter using a first look-up table of the first parameter against at least one survey parameter and a second look-up table of the second parameter against the at least one survey parameter.

3. A method as claimed in claim 2 wherein step (b) comprises: b1) obtaining, using the first look-up table, the value of the survey parameter, or a respective value of each survey parameter, corresponding to the value of the first parameter associated with the event in the first set of seismic data; and b2) obtaining, using the second look-up table, the value of the second parameter corresponding to the value of the survey parameter, or the respective values of each survey parameter, determined in step (b1).

4. A method as claimed in claim 3 and further comprising defining a third look-up table of a third parameter against the at least one survey parameter.

5. A method as claimed in claim 4 and further comprising obtaining, using the third look-up table, the value of the third parameter corresponding to the value of the survey parameter, or the respective values of each survey parameter, determined in step (b1).

6. A method as claimed in claim 2, wherein the at least one survey parameter comprises offset and interface index.

7. A method as claimed in claim 1 wherein the first parameter is PP travel time.

8. A method as claimed in claim 7 wherein the second parameter is PS travel time.

9. A method as claimed in claim 4, wherein the first parameter is PP travel time and the third parameter comprises reflection depth.

10. A method as claimed in claim 1 wherein the first parameter of the seismic data is reflection depth.

11. A method as claimed in claim 1 and comprising displaying the obtained value of the second parameter.

12. A method as claimed in claim 5, and comprising displaying the obtained value of the third parameter.

13. A method as claimed in claim 11 wherein the displaying step comprises highlighting a portion of a displayed seismic trace.

14. A method as claimed in claim 1 and comprising modifying the at least one look-up table, on the basis of the obtained value of the second parameter.

15. A method as claimed in claim 5 and comprising modifying the at least one look-up table, on the basis of the obtained value of the third parameter.

16. A method as claimed in claim 14, wherein the step of modifying the at least one look-up table, comprises modifying a model for the velocity of propagation of acoustic energy within the earth.

17. A method of processing raw seismic data traces obtained during a seismic survey to match a seismic event in a first set of raw seismic data traces with a seismic event in a second set of raw seismic data traces comprising: determining a first look-up table of a first parameter of raw seismic data traces against at least one survey parameter; determining a second look-up table of a second parameter of raw seismic data traces against the at least one survey parameter; using a predetermined model for velocity of propagation of seismic energy within the earth in the determination of the first and second look-up tables; and using the raw seismic data traces and the determined first and second look-up tables to match the seismic event in the first set of raw seismic data traces with the seismic event in the second set of raw seismic data traces and thus provide knowledge of one or more subterranean geological structures.

18. An apparatus for processing raw seismic data traces obtained during a seismic survey, comprising: means for identifying a value of a first parameter associated with a first event in a set of raw seismic data traces; means for obtaining, using first and second look-up tables, a value of a second parameter, the second parameter being associated with a second event in the set of raw seismic data traces; and means for matching the first event with the second event in the set of raw seismic data traces.

19. An apparatus as claimed in claim 18 and comprising a programmable data processor.

20. The apparatus as claimed in claim 19, wherein the first parameter-identifying means and the second parameter-identifying means are part of a program fixed in a storage medium the program being executable by the data processor.

21. The method as claimed in claim 1, wherein steps (a) and (b) are part of a program fixed in a storage medium, the program being executable by a programmable data processor.

22. The method of claim 1, wherein steps (a) and (b) are part of a program for controlling a computer.

* * * * *